United States Patent Office 3,784,641
Patented Jan. 8, 1974

3,784,641
N,N-BIS ALKOXYMETHYL AND N,N-DIMETHYLOL SULFONAMIDES
Giuliana C. Tesoro, Dobbs Ferry, N.Y., assignor to J. P. Stevens & Co., Inc., New York, N.Y.
No Drawing. Original application Nov. 16, 1965, Ser. No. 508,149, now Patent No. 3,617,190. Divided and this application Aug. 20, 1971, Ser. No. 173,637
Int. Cl. C07c *143/74, 143/78*
U.S. Cl. 260—556 A          6 Claims

ABSTRACT OF THE DISCLOSURE

Compounds of the structure:

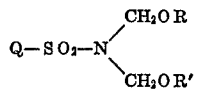

wherein R and $R^1$ are hydrogen or lower alkyl and Q is an aliphatic or aromatic group useful as crosslinking agents.

---

The present application is a divisional of application Ser. No. 508,149, filed Nov. 16, 1965 now U.S. Pat. 3,617,190.

The present invention relates to a novel class of compounds, and more particularly to new crosslinking agents, processes for crosslinking polymeric materials and to the useful products produced by the aforesaid processes.

Accordingly, it is an object of the present invention to provide a novel class of compounds.

It is a further object of the present invention to provide dimethylol sulfonamide compounds and their ethers.

It is a further object of the present invention to provide a novel class of crosslinking agents.

It is a further object of the present invention to provide processess for crosslinking polymeric materials.

It is a further object of the present invention to provide useful crosslinked polymer products of improved and enhanced properties.

In attaining the above objects, one feature of the present invention resides in dimethylol sulfonamides and ethers thereof represented by the structural formula:

(I)       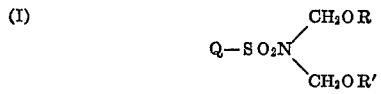

wherein R and R' are hydrogen or lower alkyl; i.e. from 1 to 5 carbon atoms, and Q is a substituted and unsubstituted aromatic or aliphatic group. Alkyl groups containing 1 to 20 carbon atoms; alkoxyalkylene groups of the structure $$C_nH_{2n+1}[OC_aH_{2a}]_x$$

wherein $n$ is 1 to 3, $a$ is 1 to 4 and $x$ is 1 to 5, aryl groups particularly those containing an aromatic ring such as phenyl, lower alkyl substituted phenyl, aralkyl such as $C_6H_5CH_2$—, $C_6H_5CH_2CH_2$— are examples thereof.

A further feature of the present invention resides in the crosslinking of polymeric materials, particularly cellulosic textile materials employing the sulfonamides of Formula I to produce crosslinked products of enhanced properties.

Compounds of Formua I are dimethylol derivatives of sulfonamides and their alkyl ethers. Although dimethylol derivatives of carboxamides have been described in the past, previous attempts to prepare dimethylol derivatives of sulfonamides have been unsuccessful and only cyclic, polymeric and resinous products have been obtained when the preparation of compounds of Formula I was tried employing specific sulfonamides and formaldehyde.

According to the present invention, dimethylol sulfonamides of Formula I may be prepared by the reaction of a selected sulfonamide with formaldehyde or a formaldehyde-yielding substance provided that the pH of the reaction mixture is carefully controlled. Products produced from the reaction are dimethylol (N,N-bis-hydroxymethyl) compounds which may readily be converted to the corresponding ether compounds (N,N-bis-alkoxymethyl) by reaction with alcohols under acidic conditions.

Ilustrative of the methods by which the dimethylol sulfonamides can be prepared are the reactions represented by Equations 1 and 2.

(1)   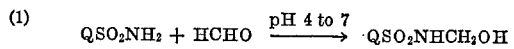

(2)   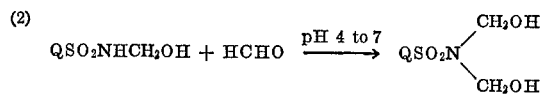

It is to be noted that the pH of the reaction system should be maintained between 4 to 7 to obtain satisfactory results.

The bis-hydroxy compound prepared as shown in Equation 2 can be converted to the corresponding ether by reaction with an alcohol as represented in Equation 3 wherein ROH represents an alcohol such as an alkanol and Q has the same meaning as previously given. It is noted that mixtures of alcohols may be used to obtain different terminal R and R' groups.

(3)   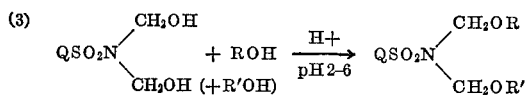

The range of conditions for the reactions shown in Equations 1 and 2 can be varied. Generally, either aqueous formaldehyde can be used or formaldehyde polymers such as paraformaldehyde can be employed in conjunction with an organic solvent. Other formaldehyde yielding substance may also be employed. As previously mentioned, it is necessary to carefully control the pH of the reaction system. Accordingly, the reaction mixture should be kept in the range of 4 to 7 and the temperature kept below about 80° C., preferably 20° to 60° C.

For the reaction with the alcohol, shown in Equation 3, an excess of alcohol is preferably used at temperatures ranging from about ambient to the reflux temperature of the alcohol and it is necessary to take the precaution that the pH of the reaction system is maintained in the range of about 2 to 6.

Excellent yields of N,N-bis-alkoxymethyl sulfonamides can be obtained directly by reacting an alkali salt of the sulfonamide with an alkyl halomethyl ether. This method of preparation is illustrated in Equations 4 and 5 where M represents alkali metal, R represents an alkyl group, X represents a halogen, and Q has the meaning given above:

(4)  $QSO_2NHM + ROCH_2X \longrightarrow QSO_2NHCH_2OR + MX$ (5)  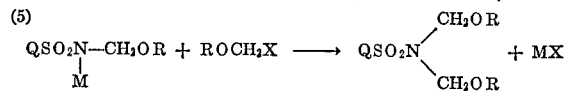

For the reactions represented by Equations 4 and 5, anhydrous conditions are required, and an inert organic solvent such as an ether or hydrocarbon solvent should be used. The amount of alkyl halomethyl ether used should be at least the stoichiometric amount based on the amount of sulfonamide salt. Reaction temperatures of 0° C. to the reflux temperature of the solvent are satisfactory and reaction times of several hours are generally required to drive the alkylation reaction to completion.

Included in the present invention are sulfonamide compounds encompassed by Formula I as set forth below:

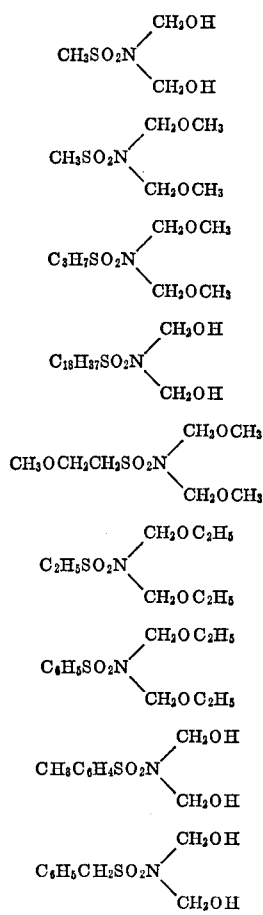

The above are merely illustrative of the various sulfonamide compounds of the present invention and do not constitute a limitation of the present invention.

Although the particular application for which the compounds are most useful is determined in part by the structure of the grouping Q, the new compounds are generally useful monomers or comonomers for the preparation of synthetic resins of the polysulfonamide type wherein the repeating unit is derived from the sulfonamide monomer and is represented by the following structural formula; wherein $x$ is the number of recurring units and has a value of 2 to 100, or higher.

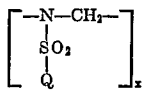

The above formula results upon elimination of both formaldehyde and water of the N,N-bis-hydroxymethyl compounds in the polycondensation reaction. In the case where only water is eliminated from the polycondensation reaction the resulting synthetic resin of the polysulfonamide type has the following repeating structure represented by the formula: wherein $x$ is as defined above.

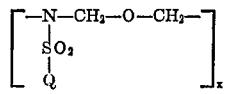

The characteristics of the polymers vary considerably depending on the monomers, molecular weight and, as a result, the specific applications and uses for the polymers are numerous. For example, the polymers can be used as textile finishing agents, coatings and the like.

In accordance with a feature of the present invention, the new compounds are particularly effective crosslinking agents for polymeric materials containing active hydrogen atoms as determined by the Zerewitinoff method. Representative polymeric materials include cellulosics such as cotton, linen and the like, in the form of textile fibers, yarns or fabrics and starch and polyvinyl alcohol which are useful as sizing agents for textile materials.

The sulfonamide compounds of the present invention are particularly effective for the crosslinking of cellulosic textile fabrics in order to enhance their properties.

The cosslinking reaction may be schematically represented by Equation 6 wherein the symbol Cell-OH is used to represent a cellulose molecule such as, for example, may be found in a cotton textile fabric.

(6)

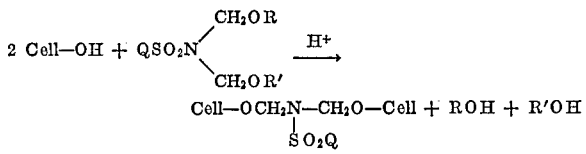

The symbols Q, R' and R in the foregoing equation have the same meaning as previously given. It is noted that the crosslinked cellulosic textile containing sulfur and nitrogen comprises the structure shown as the product of Equation 6.

The reaction shown in Equation 6 above is preferably carried out in the presence of a catalyst. Suitable catalysts include, for example, acids or acid-forming compounds such as acid forming salts and the like. As a result of the crosslinking reaction, the cellulosic textiles, particularly woven fabrics have imparted thereto, improved dimensional stability, resilience, crease recovery and flat drying properties. Because of the absence of the amide hydrogen, the crosslinked cellulosic product does not exhibit a tendency to chlorine retention.

The tendency to retain chlorine from wash solutions containing hypochlorite is a very undesirable property of many crosslinked cellulosic products obtained by methods known in the art. The freedom from this tendency is a particularly advantageous feature of the processes employing the novel crosslinking agents described hereinabove.

Not only are the crosslinking agents suitable for treatment of cellulosic textile fabrics but they are suitable for the treatment of textile materials in other forms such as yarns or fibers. Moreover, the novel crosslinking compounds are useful for reaction with sizing materials such as starch or polyvinyl alcohol for sizing processes where it is desired to insolubilize the sizing compound in situ. By carrying out the treatment of the textile substrate with the sulfonamide compound in the presence of the sizing material, there is provided a method for securely attaching the sizing material to the textile surface and thereby obtaining a durably sized material. It is believed that the reaction between the sulfonamide and the sizing material and the textile substrate occurs simultaneously and may be in competition with one another and, accordingly, the nature of the final product produced would be dependent in part upon the amounts of reagent, the polymer present, and on the reaction conditions.

The reaction of cellulosic textiles with the compounds of the present invention can be carried out conveniently by contacting the textile with a solution containing the reagent and catalyst. Alternatively, the reagent and catalyst can be applied in separate steps. Any suitable means such as padding, spraying, dipping and the like can be used for the treatment. After removing excess solution, the textile can be dried and then heated for a brief period of time for the curing operation in order to complete the reaction. If desired, other manufacturing steps can be interposed between the drying and curing steps. For example, a dried fabric can be converted to a garment, thereafter pressed and then cured to set the configuration of the garment. In this manner, the desired configurations which may take the form of creases or pleats are permanently set in the garment or fabric by carrying out the crosslinking reaction while the garment is held in predetermined configuration. After the curing step, the textile can be washed to remove the catalyst and other soluble residues.

Concentrations of the sulfonamide reagent used in the process can be varied depending upon the specific reagents and the intended results. Generally about 3% to about 30% based on the weight of the cellulose textile treated are satisfactory and concentrations of 5% to 20% are preferred.

Acids or acid-yielding substances can be used, under the preferred conditions of the present invention, to catalyze the reaction between the polymeric material containing active hydrogen atoms and the sulfonamides. Many suitable catalysts are known in the art. Typical are amine and ammonium salts of mineral acids; mineral acid salts of bivalent metal such as magnesium and zinc; e.g. $MgCl_2$, $ZnCl_2$, non-volatile organic acid such as citric, tartaric or oxalic acids. The optium amount of catalyst depends on the particular compound selected. Generally, amounts of about 0.5% to 6% based on the weight of cellulose treated are usually satisfactory.

Under the preferred conditions of the reactions described above, a solvent is employed for the application of the treating reagent. For this purpose, water or any organic solvent can be used depending on the solubility characteristics of the reagent and catalysts. After the treatment, drying can be carried out by any suitable means at temperatures ranging from ambient to 150° C. Curing is conveniently carried out at 100° C. to 200° C. for a time ranging from 10 minutes to a few seconds. Curing cycles outside this range can also be used. Many different sources of heat for the curing step can be used such as a force draft oven, infrared, or radiant heat. The reagents may be used alone or in admixture with other crosslinking agents or they can be used in conjunction with other textile finishing agents used to impart a specific characteristic to the textile such as softeners, water repellents, optical whiteners, stiffeners, sizing compounds and the like.

The following examples further illustrate the scope of the present invention. In the examples the parts are indicated by weight unless otherwise specified. The test methods referred to in the examples are identified below:

Crease recovery: ASTM–D1295–60T (in degrees, warp+filling)
Tensile strength: Ravel Strip Method—ASTM–D1682–59T (lbs.)
Tear strength: ASTM–D1424–63 (lbs.)
Abrasion resistance: Stoll Flex Abrader, ½ lb. head, 2 lbs. toggle, ASTM–D1175–61T (in cycles)
Damage due to retained chlorine: AATCC–92–1962 (percent strength lost)
Shrinkage: AATCC–96–1960T (in percent)
Laundering: Samples laundered in automatic home-type agitator washing machine at 60° C. for the full cycle (FAB detergent), 5–10 lbs. load. Samples tumble dried.

EXAMPLE I

N,N-bis(methoxymethyl)methanesulfonamide

Methane sulfonamide (285 g., 3.0 m.) in 2250 ml. tetrahydrofuran was treated cautiously with 59% sodium hydride/mineral oil (122 g., 3.0 m.), and the resulting mixture heated under reflux until no further evolution of hydrogen occurred (to form the sodium salt). Methyl chloromethyl ether (241 g., 3.0 m.) was then added and the mixture was stirred for several hours to complete the first alkylation.

A small portion of the reaction mixture removed, filtered and evaporated at this stage gave N-(methoxymethyl) methanesulfonamide, identified by its infrared absorption bands at 3.03 (N—H), 7.5 and 8.7 ($SO_2N$), and 9.2$\mu$ ($OCH_3$) and formaldehyde analysis (found 21.3%, calcd. 21.6%) by the method indicated below.

To the bulk of the reaction product, a second portion of 59% sodium hydride/mineral oil (122 g., 3.0 m.) was cautiously added and the reaction again heated under reflux until hydrogen evolution ceased. A second portion of methyl chloromethyl ether (278 g., 3.45 m.) was added and the mixture stirred for 6 hours. The insoluble salts were removed by filtration and the filtrate was concentrated in vacuum to give the crude N,N-bis(methoxymethyl) methanesulfonamide (395 g., 72% yield).

A 200 g. portion of the crude product was distilled at reduced pressure to give a 77% recovery of pure product (B.P. 85–95° at 0.5 mm.), having a refractive index of 1.4454 at 27°.

The purity was established by measuring the "total formaldehyde content" by a modification of the method of Bricker and Johnson (Anal. Chem. 17 400 (1945)).

*Analysis.*—Percent total $CH_2O$: Found 32.2%, calcd. 32.8%.

EXAMPLE II

N,N-dimethylol methanesulfonamide

Methane sulfonamide (95.1 g., 1.0 m.) was dissolved in 37% aqueous formaldehyde (172 g., 2.0 m.) and water (100 ml.). The pH of the solution was adjusted to 5.5 with solid potassium bicarbonate, and the reaction mixture was heated to 87° during 6 hours. The reaction mixture was then permitted to stand at room temperature for 70 hours.

1,2-dimethoxyethane was added and the water was removed by repeated drying over anhydrous magnesium sulfate. Finally, the mixture was filtered, and volatile material removed in vacuum to give the product (132 g., 85% yield). "Total formaldehyde" analysis by the method of Example I showed that the liquid product contained 38.9% $CH_2O$ (calcd. 38.7%).

EXAMPLE III

N,N-bis(methoxymethyl)-p-toluenesulfonamide

This compound was prepared from p-toluenesulfonamide by the same method given in Example I. The crude product was distilled for purification, B.P. 130–141° at 0.3 mm., and was obtained in 40% yield. The pure product was found to have a refractive index of 1.5152 at 24.5° and was characterized by elemental analysis:

*Analysis.*—Calc. for $C_{11}H_{17}NO_4S$ (percent): C, 51.0; H, 6.14; N, 5.40; S, 12.4. Found (percent): C, 50.59; H, 6.56; N, 5.61; S, 12.09.

EXAMPLE IV

Samples of plain weave cotton fabric (commonly known as 80 x 80 print cloth) were treated with a 20% dioxane solution of the product of Example I. The treatment was carried out on a laboratory padder, setting the rolls at such a pressure as to give 80–90% wet pickup. The samples so treated were dried at 50° C. in a laboratory forced draft oven and then padded with an aqueous solution containing 4% magnesium chloride hexahydrate catalyst. The aqueous catalyst solution was saturated with sodium chloride. The samples were then dried at 50° C. and cured for 5 minutes in a forced draft oven at the temperatures specified below. The samples were washed, dried and analyzed for sulfur and nitrogen to determine the amount of reacted compound present on the fabric after treatment.

The following results were obtained:

| Sample | Curing temperature, °C. | Percent Wt. gain | Percent Yield | Percent Nitrogen | Percent Sulfur | Sulfur/nitrogen ratio Calcd. | Sulfur/nitrogen ratio Found |
|---|---|---|---|---|---|---|---|
| B-1 | 150 | 3.1 | 28 | 0.20 | 0.44 | 2.3 | 2.2 |
| B-2 | 165 | 2.9 | 25 | | | | |

The properties of the treated samples were tested and the following results were obtained:

| Sample | Crease recovery Wet | Crease recovery Dry | Tensile strength, warp | Percent damage due to retained chlorine |
|---|---|---|---|---|
| B-1 | 236 | 240 | 32 | 4 |
| B-2 | 241 | 244 | 28 | None |
| Control | 182 | 150 | 47 | 4 |

EXAMPLE V

Samples of plain weave cotton fabric (commonly known as 80 x 80 print cloth) were treated with a 15% aqueous solution of the product of Example II, to which there was added 4% magnesium chloride hexahydrate. The treatment was carried out on a laboratory padder, setting the rolls at such a pressure as to give 93% wet pickup. The samples so treated were dried at 60° C. and then cured under the conditions specified below in a forced draft oven. After curing, the samples were neutralized in dilute potassium bicarbonate solution, washed in a non-ionic detergent solution at 60° C. and dried. The samples were conditioned overnight at 21° C. and 65% relative humidity and then weighed on an analytical balance to determine the weight increases due to the treatment. The following results were obtained:

| Sample | Curing temp., time | Percent Wt. gain | Percent Yield | Percent S Found | Percent S Calcd. from W.G. | Percent N Found | Percent N Calcd. from W.G. |
|---|---|---|---|---|---|---|---|
| A-1 | 122° C., 3 minutes | 3.9 | 36 | 1.22 | 1.01 | 0.66 | 0.44 |
| A-2 | 122° C., 5 minutes | 4.1 | 38 | | | | |
| A-3 | 150° C., 3 minutes | 5.3 | 49 | | | | |
| A-4 | 150° C., 5 minutes | 5.9 | 55 | 1.87 | 1.47 | 0.77 | 0.64 |

The physical properties of the treated samples were as follows:

| Sample | Crease recovery Orig. Dry | Crease recovery Orig. Wet | Crease recovery 10L. Dry | Crease recovery 10L. Wet | Percent shrinkage 1L. W | Percent shrinkage 1L. F | Percent shrinkage 10L. W | Percent shrinkage 10L. F | Tensile strength, warp | Tear str., warp | Abrasion resistance—W | Percent damage due to retained chlorine |
|---|---|---|---|---|---|---|---|---|---|---|---|---|
| A-1 | 223 | 230 | 217 | 227 | 0.5 | 2.0 | 1.5 | 3.0 | 40 | 1.3 | 275 | None |
| A-2 | 221 | 241 | 222 | 241 | 0.5 | 3.0 | 1.0 | 3.5 | 33 | 1.1 | 185 | 5 |
| A-3 | 265 | 285 | 254 | 280 | 0.5 | 2.5 | 0.5 | 2.5 | 29 | 1.0 | 125 | 4 |
| A-4 | 265 | 275 | 244 | 282 | 0.5 | 1.5 | 0.5 | 2.0 | 27 | 0.8 | 85 | 7 |
| Untr. control | 150 | 180 | 186 | 197 | 5.0 | 5.5 | 6.5 | 5.3 | 47 | 1.4 | 200 | 4 |

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A sulfonamide compound of the structure:

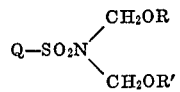

wherein R and R' are hydrogen or lower alkyl and Q is selected from the group consisting of $C_1$–$C_3$ alkyl, phenyl, lower alkyl substituted phenyl and $CH_3OCH_2CH_2$—, provided that when Q is phenyl or lower alkyl substituted phenyl R and R' are lower alkyl groups.

2. A sulfonamide compound as defined in claim 1 which is N,N-bis-methoxymethyl methane sulfonamide.

3. A sulfonamide compound as defined in claim 1 which is N,N-dimethylol methane sulfonamide.

4. A sulfonamide compound as defined in claim 1 which is N,N-bis(methoxymethyl)p-toluene sulfonamide.

5. A sulfonamide compound as defined in claim 1 wherein Q is selected from the group consisting of $CH_3$, $C_3H_7$ and $C_2H_5$.

6. A sulfonamide compound as defined in claim 1 wherein Q is phenyl or tolyl.

References Cited

UNITED STATES PATENTS 2,361,322  10/1944  Schroy _____ 260—556 A

FOREIGN PATENTS 259,483  1/1963  Australia _____ 260—556 C

OTHER REFERENCES

C. A. 44:10580–10581 (Marin et al., 1950).

HENRY R. JILES, Primary Examiner
S. D. WINTERS, Assistant Examiner

U.S. Cl. X.R.

260—556 AR